United States Patent [19]

Wilson et al.

[11] 3,756,756
[45] Sept. 4, 1973

[54] PRESSURE MOLD FOR REMOVING LIQUID FROM MATERIAL BEING CAST

[75] Inventors: John E. Wilson, Salt Lake City, Utah; Carl F. Austin, Inyokern, Calif.; William H. Sayler, Salt Lake City, Utah

[73] Assignee: The United States of America as represented by the Secretary of the Navy, Washington, D.C. ; by said Austin

[22] Filed: May 25, 1972

[21] Appl. No.: 256,831

[52] U.S. Cl.................. 425/84, 425/420, 425/812, 425/DIG. 119, 425/DIG. 119, 100/116, 100/126
[51] Int. Cl............................................... B28b 3/04
[58] Field of Search...................... 425/84, 85, 420, 425/812, DIG. 119; 100/116, 126; 106/89

[56] References Cited
UNITED STATES PATENTS

| | | | |
|---|---|---|---|
| 87,830 | 3/1869 | Ellis et al............................ | 425/84 |
| 1,071,020 | 8/1913 | Bartholomew............. | 425/DIG. 119 |
| 2,533,263 | 12/1950 | Johnson............................ | 425/85 X |
| 3,002,248 | 10/1961 | Willson................................ | 425/84 |

FOREIGN PATENTS OR APPLICATIONS 1,060,334   3/1967   Great Britain...................... 425/812

*Primary Examiner*—R. Spencer Annear
*Attorney*—R. S. Sciascia, Roy Miller et al.

[57] ABSTRACT

Grooved plates and end grain redwood boards are combined to form a filtering means used in the preparation of high strength cementitious material.

1 Claim, 4 Drawing Figures

PATENTED SEP 4 1973  3,756,756

PRESSURE MOLD FOR REMOVING LIQUID FROM MATERIAL BEING CAST

BACKGROUND OF THE INVENTION

1. Field of the Invention

This invention relates to apparatus and a method for preparing high strength cementitious material. More particularly, this invention relates to apparatus and a method for removing excess water and air from freshly mixed cementitious material prior to curing.

2. Description of the Prior Art

It has been thought for many years that if excess water and air could somehow be removed from freshly mixed cementitious material (concrete or plaster) prior to curing, the resulting product would be void-free and be much stronger than that obtained by preparation methods now used. However, the question as to how much water is excess water and the problem of how to go about removing it have not been resolved.

On the question of how much water is excess water, it is fairly well universally agreed that all water in excess of water of hydration is excess water. But this has not been proven because it has been impossible to remove all water in excess of water of hydration utilizing prior art methods and apparatus.

Many methods and types of apparatus have been used in attempts to remove excess water from freshly mixed cementitious material. One popular method has been that of curing the material in a sand mold. The sand mold is supposed to absorb excess water as the material cures. This method has not been successful because the sand mold only absorbs water from the surface regions of the material and a non-uniform final product which is relatively void-free near its surface but not in its interior results. Another popular method has been to place freshly mixed material in a mold having one or more small openings in it and then vibrating the mold. The vibration is supposed to settle or compact the mix and excess water is supposed to exit via the small opening or openings. This method has not been successful because it causes layers or strata to be formed in the material and it does not remove all excess water.

Perhaps the best conceived method for removing excess water and air from freshly mixed cementitious material is that disclosed by Boyle in U. S. Pat. No. 2,047,356. Boyle describes a mold in which cementitious mix can be put under pressure to remove excess water. The mold contains a plurality of holes through which excess water and air can exit as the material is placed under pressure. However, the perssure contemplated by Boyle can not possibly approach the magnitude nexessary for the removal of all excess water because the filter system (system utilized to retain the mix in the mold while allowing excess water and air to escape) consists of screen and canvas covering the holes through which the water and air escapes. Boyle does not specify any particular pressure or range of pressures, choosing rather to describe his pressure as "a very high pressure." At pressures up to 100 psi, or perhaps several hundred psi, a screen and canvas filter system would be adequate. But at truly high pressures, i.e., pressures up to several thousand psi, canvas, screen, water, air and mix would all be simultaneously forced out through the holes in the Boyle mold. Furthermore, as Boyle describes it, the process contemplated also involves vibrating the mold which, for reasons stated above, is undesirable.

SUMMARY OF THE INVENTION

A filter system which enables a mold to contain cementitious material while excess water and air are being expelled therefrom under high pressure has now been found. Individual filters which cover openings in the mold and allow water and air to escape while containing the cementitious material consist of a grooved pusher plate and a filter pad of end grain redwood board. The plate is sized and grooved in a manner which permits water (and air) to flow around it and out through the opening which it covers. The end grain redwood board permits water and air but not cement to pass through it from the interior of the mold and reach the grooves on the face of the plate through which it can escape.

The method of this invention involves the compaction of a cementitious mix under certain preferred high pressures for certain optimum lengths of time. The preferred pressures and times are specified below.

DESCRIPTION OF THE PREFERRED EMBODIMENT

Figure 1:
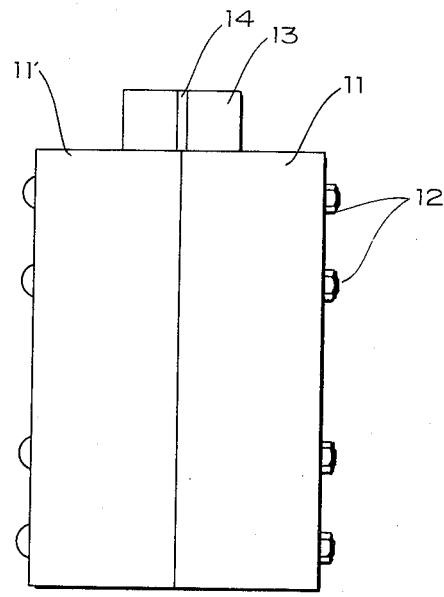
FIG. 1 is an elevational view of a mold suitable for use in practicing this invention.

Going first to the drawing which depicts apparatus used in practicing this invention, FIG. 1 is an elevational view of a mold comprised of two halves 11 and 11' which may be fastened together by means of bolts 12 or some other suitable means. A plunger 13 is shown protruding from the top of the mold. The plunger is a loose fit, allowing fluids to escape through the annulus between the plunger and the mold. The plunger is for use in applying pressure to freshly mixed cementitious material within the mold by means of a press or its equivalent.

Figure 2:
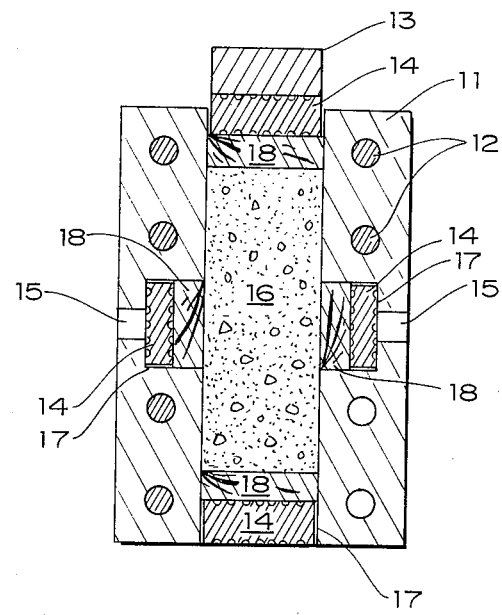
FIG. 2 is a cross-sectional view of the mold of FIG. 1.

FIG. 2 is a cross-sectional view of the mold of FIG. 1 showing one half of the mold 11, bolts 12, the plunger 13, and a plurality of pusher plates 14. This view depicts a plurality of openings 15, in addition to the one through which the plunger moves, through which water and air may escape as pressure is applied to a freshly prepared mixture of cementitious material 16 within the mold. Depressions 17 which are larger in diameter than openings 15 are machined into the interior wall of the mold in locations such that the openings lead into them. Grooved pusher plates 14 are fitted loosely into the depressions in a manner whereby the plates cover the openings. End grain redwood boards 18 are abutted against the interior faces of each of the plates. The boards fit tightly into depressions 17, i.e., the boards have diameters approximately equal to those of the depressions.

In order to provide annular space through which fluid may flow around the grooved plates, the plates are slightly smaller in diameter than the depressions. However, in order to prevent the boards from being extruded when pressure is applied to material within the mold, the annular area around the pusher plates can not be very large. The width of the annulus should preferably not be greater than about 0.010 inch. In other words, the diameter of a pusher plate should not be less than about 0.020 inch smaller than that of a depression into which the plate fits. In most cases an annular width of about 0.005 inch will permit sufficient fluid to pass around the periphery of a pusher plate.

Figure 3:
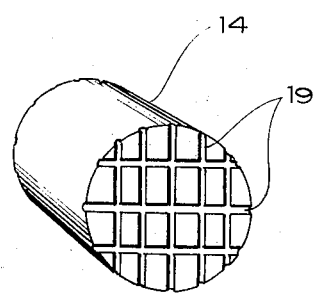
FIG. 3 is a perspective view of a pusher plate suitable for use in placing cementitious material under pressure according to this invention.

FIG. 3 is a perspective view of a pusher plate 14 showing a plurality of facial grooves 19 criss-crossing its faces. Both faces are grooved in order to permit fluid to collect on the inner face, pass through the annulus, collect on the outer face, and, finally, escape through openings 15 (FIG. 2). Only plates for use in conjunction with openings which are smaller in diameter than they are, i.e., side openings, need be grooved on both faces.

Figure 4:
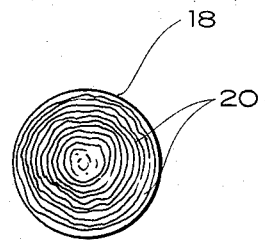
FIG. 4 is a cross-sectional view of an end grain redwood board.

FIG. 4 is a cross-sectional or end view of an end grain redwood board. It will be noted that the particular board depicted appears to have been cut from the exact center of a redwood leg because rings 20 appear to be complete. Notwithstanding FIG. 4, any end grain redwood board, whether it be from the exact center of a log or elsewhere will suffice for the purposes of this invention.

In operation, when pressure is applied to the mixture of cementitious material by means of a press or its equivalent pressing on the plunger, excess water and air is forced out of the cementitious material through the grains in the redwood boards. After passing through the boards the water collects in the grooves on the interior faces of the pusher plates from whence it travels to the peripheral annulus. From the peripheral annulus of the upper pusher plate and plunger, the water escapes to the exterior of the mold. In the side ports, the water travels to the grooves on the external faces and then out through the openings in the mold.

In the foregoing description, boards 18 have been referred to as redwood boards. While it may not be positively stated that no other wood will suffice, certain other woods have been tried with very poor results. Balsa wood is too soft and fails when it is pressed against the grooved faces of the plates. Water will not flow through Douglas Fir at a fast enough rate. Nor will water flow through end grain hardwood boards at a fast enough rate. In order to retain cementitious material and allow water and air to pass through, high shear strength and clean, straight grains have been found to be necessary properties for the wood. Of wood not tried, cedar offers a likely possibility.

By utilizing the above-described apparatus, it is possible to place freshly prepared cementitious material under almost any high pressure desired. The preferred method according to this invention involves placing freshly mixed concrete under a pressure in the range of from about 7,000 psi to about 15,000 psi for a length of time in the range of from about 0.25 hour to about 6 hours and then lowering the pressure to atmospheric pressure and allowing the cencrete to cure. For plaster type materials such as Alcast (a mixture of aluminum and Plaster of Paris) somewhat lower pressures on the order of from about 2,500 psi to about 3,000 psi are preferred. Any manner presently used in the industry, i.e., fog, steam, or ambient, may be used to cure the cementitious or plaster type materials.

The following examples depict the strengths obtained from various samples after carrying out the above steps.

Example 1

I. Cement/sand ratio — 0.510
  Molding pressure — 7,000 psi
  Molding time — 6 hours
  Breaking strength of product — 13,350 psi II. Cement/sand ratio — 1.500
  Sample a —
    Molding pressure — 9,040 psi
    Molding time — 0.25 hour
    Breaking strength of product — 16,200 psi
  Sample b —
    Molding pressure — 9,040 psi
    Molding time — 3 hours
    Breaking strength of product — 19,700 psi
  Sample c —
    Molding pressure — 9,040 psi
    Molding time — 6 hours
    Breaking strength of product — 21,250 psi

Example 2

I. Sample a —
  Plaster of Paris/water ratio — 1.82
  Molding pressure — 2,820 psi
  Molding time — 36 minutes
  Length of sample — 4,250 inches
  Breaking strength of product — 7,800 psi Sample b —
  Plaster of Paris/water ratio — 1.82
  Molding pressure — 2,820 psi
  Molding time — 36 minutes
  Length of sample — 2.125 inches
  Breaking strength of product — 7,720 psi Sample c —
  Alcast (50/50) — wet mix
  Molding pressure — 3,000 psi
  Molding time — 36 minutes
  Length of sample — 1.9 inches
  Breaking strength of product — 4,917 psi In FIG. 2 of the drawing, it will be noted that three static filters (filters not driven by a plunger) and one active filter (filter driven by a plunger) are depicted. These numbers may be varied. For example, if very short blocks of cementitious material are being prepared, one plunger and active filter and one static filter at the bottom of the mold may suffice. On the other hand, if longer blocks of cementitious material are being prepared, i.e., blocks having final lengths of about 8 inches or more, it is desirable to use at least three static filters and one plunger driven active filter. And it may be desirable to alter the apparatus by replacing all of the static filters by plunger driven active filters in order that a "make up volume" of cement be provided to compensate for the lost fluid and gas volumes. If very long blocks of cementitious material, i.e., several feet long, are being prepared it may be desirable to use a combination of six or eight or more plungers and large diameter active filters.

We claim:

1. Apparatus for removing excess water and air from freshly mixed cementitious material, said apparatus comprising:
  a mold having a plurality of openings through which water and air can escape;

a plate covering the interior of each said opening, said plate being grooved and sized so that water and air from the interior of said mold can reach said opening around it;

an end grain redwood board covering the interior face of each said plate; and means for applying pressure to cementitious material within said mold.

* * * * *